United States Patent [19]

Hama

[11] Patent Number: 5,687,457
[45] Date of Patent: Nov. 18, 1997

[54] CLAMPING BAND

[75] Inventor: Taira Hama, Chino, Japan

[73] Assignee: Kabushiki Kaisha Mihama Seisakusho, Nagano-ken, Japan

[21] Appl. No.: 604,657

[22] Filed: Feb. 21, 1996

[30] Foreign Application Priority Data

Nov. 1, 1995 [JP] Japan .................... 7-285337

[51] Int. Cl.$^6$ .................................... B65D 63/00
[52] U.S. Cl. .................. 24/20 CW; 24/20 R; 24/23 EE
[58] Field of Search ............... 24/20 CW, 20 R, 24/20 EE, 23 EE, 20 W, 23 W

[56] References Cited

U.S. PATENT DOCUMENTS

| | | | |
|---|---|---|---|
| 4,299,012 | 11/1981 | Oetiker | 24/20 CW |
| 4,750,242 | 6/1988 | Calmettes et al. | 24/20 CW |
| 4,991,266 | 2/1991 | Oetiker | 24/20 CW |
| 5,105,509 | 4/1992 | Lilley | 24/20 CW |
| 5,191,684 | 3/1993 | Kenwright | 24/20 CW |
| 5,216,783 | 6/1993 | Calmettes et al. | |
| 5,251,360 | 10/1993 | Putz | 24/20 CW |
| 5,339,496 | 8/1994 | Oetiker | 24/20 CW |

FOREIGN PATENT DOCUMENTS 3-163294  7/1991  Japan .

*Primary Examiner*—Victor N. Sakran
*Attorney, Agent, or Firm*—Jordan and Hamburg

[57] ABSTRACT

A clamping band has a metallic band section with a first end, formed into a Y-shaped fork having a pair of fork pieces. A pair of concave sections are formed in each side edge of the band section, and are capable of accommodating the fork pieces. A clamping ear is formed by bending a part of the band section. The clamping ear is provided at a prescribed position at which both end sections of the band section are overlapped when the band section is formed into a loop. An engaging piece is provided in the vicinity of the Y-shaped fork of the band section. A first engagement hole is capable of engaging with the engaging piece. The first engagement hole is provided in the vicinity of the other end of the band section, whereby the band section is formed into the loop when the first engagement hole is engaged with the engaging piece.

20 Claims, 5 Drawing Sheets

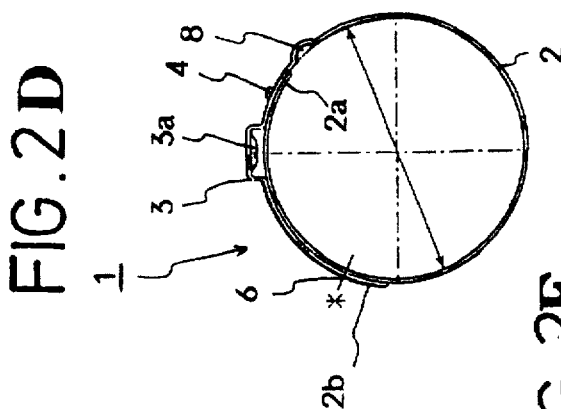
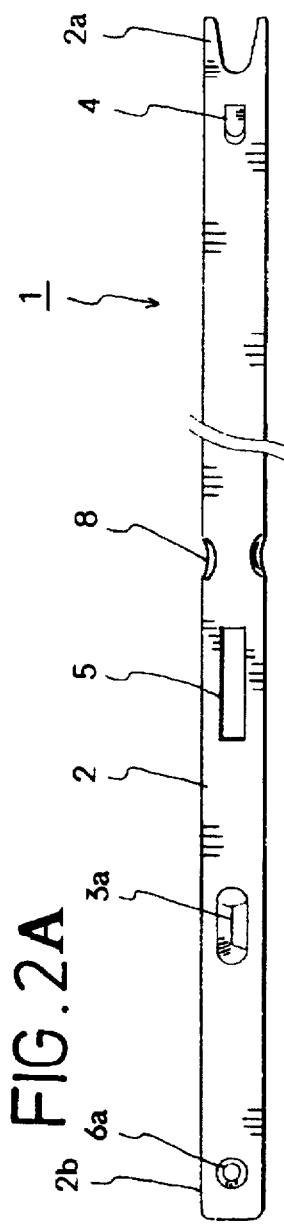
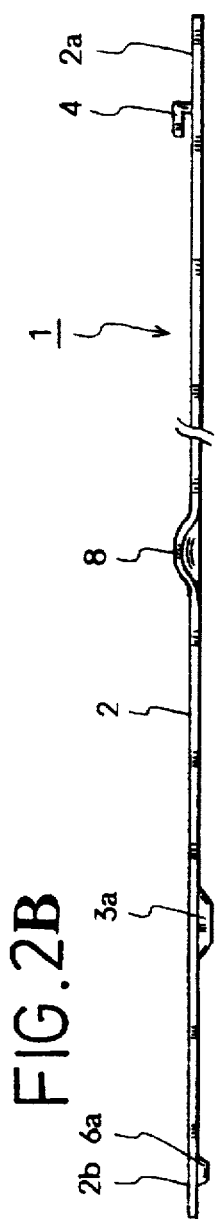
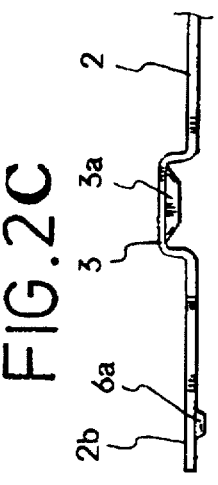
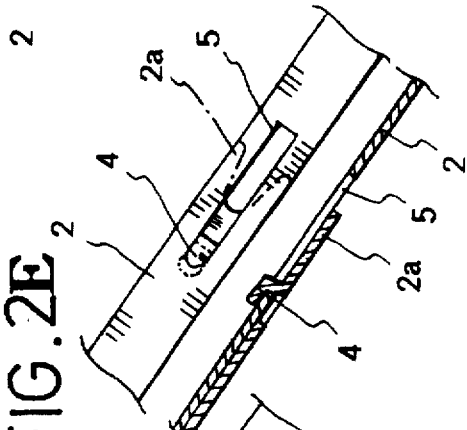
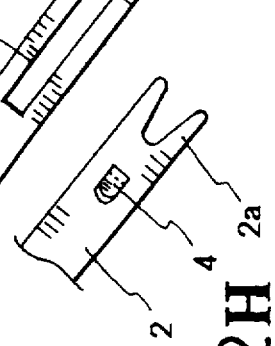
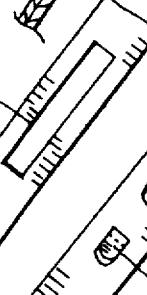

FIG.7A
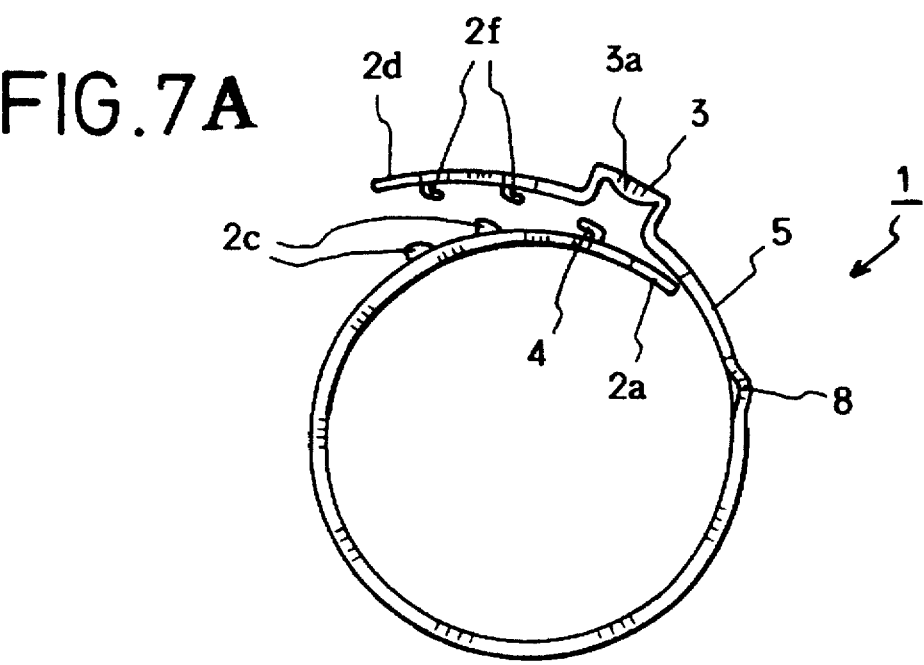
FIG.7B
FIG.7C
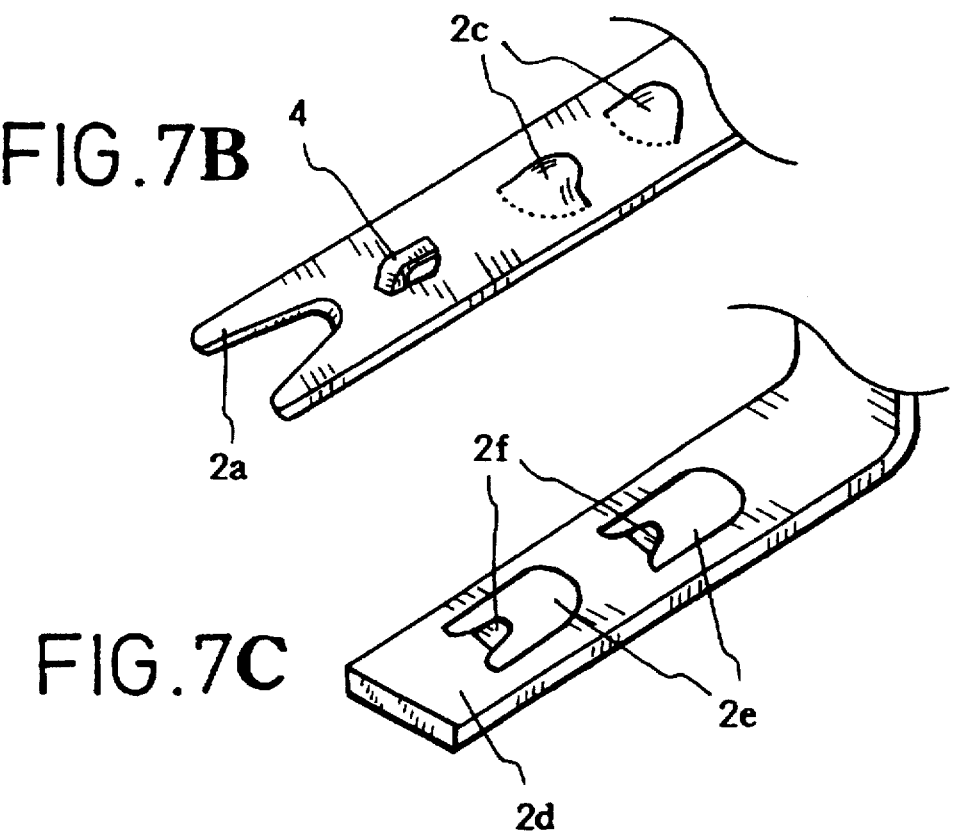

CLAMPING BAND

BACKGROUND OF THE INVENTION

The present invention relates to a clamping band for tightly clamping a member to be clamped, e.g., a joint section of a transmission mechanism, a radiator pipe of a car.

Conventionally, in a universal joint of a transmission mechanism of a car, grease is applied to bearings and joint members as a lubricant. The joint members are covered with a rubber or plastic cover, and the cover is tightly clamped by clamping bands. A radiator pipe is also connected to a radiator and water-tightly clamped by the clamping band so as to prevent water leakage.

The applicant of the present invention invented a clamping band having a clamping ear, which is capable of securely clamping without spring back (see Japanese Patent Kokai Gazette No. 3-163294). The clamping band consists of two parts: a band member and a clamping member. The band member is a looped metallic band, and there is formed an engaging claw in one end of the band member. The clamping member has the clamping ear in the center part. One end of the clamping member is spot-welded on the band member; and an engagement hole is bored on the other side of the clamping ear.

When clamping a member to be clamped, e.g., a hose, which is to be connected with a pipe, first the member is inserted through the looped clamping band, then the clamping band is placed on a connecting section of the member and the pipe. To clamp the member to, the clamping ear is compressed in the circumferential direction of the band member to reduce diameter thereof. By reducing the diameter of the band member, the engaging claw can be engaged with the engagement hole. By engaging the engaging claw with the engagement hole, the diameter-reduced state of the band member tightly kept even if the elasticity of the member to be clamped or the spring back of the compressed clamping ear works to enlarge the diameter of the band member.

However, since said conventional clamping band consists of the two parts: the band member and the clamping member, it is difficult to correctly weld the clamping members at prescribed points on the band members, so that manufacturing efficiency cannot be raised. When the diameter of the band member is reduced, a step section is formed in an overlapped part, in which the band member and the clamping member are overlapped, on an inner face of the looped band member, and the clamping member is apt to shift in the transverse direction of the band member. The step section and the shift can be absorbed if the member to be clamped is made of an elastic material, e.g., rubber. But recently the joint members of the universal joint are covered with a plastic cover, so grease in the cover will be leaked by the step section or the shift. Further, in the case of clamping, a long hose, the hose must be inserted through the clamping band, which has been welded into the looped shape, prior to connecting the hose with another member. Namely, it is troublesome to attach the clamping band on a long member after the long member is connected.

SUMMARY OF THE INVENTION

An object of the present invention is to provide a clamping band having a simple structure, which can be manufactured efficiently.

Another object is to provide a clamping band, which is capable of securely clamping and easily attaching.

To achieve the objects, the clamping band of the present invention comprises:

a metallic band section having a first end and a second end, the first end of the band section being formed into a Y-shaped fork having a pair of fork pieces;

a pair of concave sections formed in each side edge of the band section by bending a part of each side edge thereof outward, the concave sections being capable of respectively accommodating the fork pieces of the Y-shaped fork;

a clamping ear formed by bending a part of the band section into a gate shape, the clamping ear being provided at a prescribed position at which both end sections of the band section are overlapped when the band section is formed into a loop, the clamping ear being capable of reducing diameter of the band section formed into the loop when the clamping ear is compressed in the circumferential direction of the looped band section;

an engaging piece provided in the vicinity of the Y-shaped fork of the band section; and a first engagement hole being capable of engaging with the engaging piece, the first engagement hole being provided in the vicinity of the second end of the band section, whereby the band section is formed into the loop when the first engagement hole is engaged with the engaging piece.

In the clamping band, the fork pieces of the Y-shaped fork can be accommodated in the concave sections when the clamping ear is compressed in the circumferential direction of the looped band section so that no step section is formed in an inner face of the looped band section.

In the clamping band, the first engagement hole can be a long hole, which is elongated in the longitudinal direction of the band section, and the engaging piece is capable of moving along the first engage hole when the clamping ear is compressed in the circumferential direction of the looped band section.

Another clamping band embodiment further comprises:

a second engagement hole being provided in the vicinity of the first end of the band section; and an engaging section capable of engaging with the second engagement hole, the engaging section being provided in the vicinity of the second end of the band section, wherein the band section is formed into the loop by engaging the engaging piece with the first engagement hole on one side of the clamping ear and engaging the engaging section with the second engagement hole on the other side thereof.

In the clamping band, a dimple is optionally formed in a top face of the clamping ear.

In the clamping band, a recess for resistance welding is optionally formed in the vicinity of the second end of the band section.

In a further embodiment of the clamping band, the engaging piece is formed by cutting the band section to make a tongue piece and bending the tongue piece to form into an L-shape, which is capable of engaging with the first engagement hole.

In yet another embodiment of the clamping band, the second engagement hole is formed by cutting the band section to make a cutting hole and embossing an edge of the cutting hole, and the engaging section is a tongue piece capable of inserting into the second engagement hole.

In the clamping band, a plurality of the second engagement holes may be provided in the band section.

In the clamping band, a plurality of the engaging sections may be provided in the band section.

In the present invention, since the clamping band consists of only one member, a number of parts and a number of manufacturing steps is reduced, so that manufacturing cost of the clamping bands is reduced, and manufacturing accuracy is raised.

When the clamping ear is compressed in the circumferential direction, the fork pieces of the Y-shaped fork are fitted and accommodated in the concave sections, so that no step section is formed in an inner face of the looped band section. By forming the flat inner face with no step section, the clamping band is capable of securely and tightly clamping. Thus, the safety and reliability of the clamping band is raised.

If the first engagement hole is the long hole in which the engaging piece is guided, its movement when the clamping ear is compressed in the circumferential direction of the looped band section, a part of an overlapped section of the band section is prevented from shifting in the transverse direction.

In the case of forming the band section into the loop by engaging the engaging piece with the first engagement hole on the one side of the clamping ear and engaging the engaging section with the second engagement hole on the other side thereof, the clamping band is easily attached to and detached from the any members to be clamped.

If the dimple is formed in the top face of the clamping ear, stress in the clamping ear is absorbed when the clamping ear is compressed, so that the clamping ear is able to resist spring back and diameter increase of the band section is securely prevented.

If the recess for resistance welding is formed in the vicinity of the second end of the band section, the resistance welding to fix the second end can be executed effectively.

BRIEF DESCRIPTION OF THE DRAWINGS

Embodiments of the present invention will now be described by way of examples and with reference to the accompanying drawings, in which:

FIG. 2A is a plan view of a band section of the first embodiment;

FIG. 2B is a front view of the band section;

FIG. 2C is a partial front view of a second end section of the band section in which a clamping ear is formed;

FIG. 2D is a front view of the clamping band, which has been formed into a loop shape;

FIG. 2E is a partial plan view showing a engaging state of an engaging piece and a first engagement hole;

FIG. 2F is a partial sectional view showing the engaging state of the engaging piece and the first engagement hole;

FIG. 2G is a partial plan view showing the engagement hole of the band section;

FIG. 2H is a partial plan view showing first end section of the band section;

FIG. 7A is a front view of the clamping band of a second embodiment;

FIG. 7B is a partial perspective view of the first end section of the band section of the second embodiment; and FIG. 7C is a partial perspective view of the second end section of the band section of the second embodiment.

DETAILED DESCRIPTION OF THE PREFERRED EMBODIMENTS

Preferred embodiments of the present invention will now be described in detail with reference to the accompanying drawings.

Figure 1:
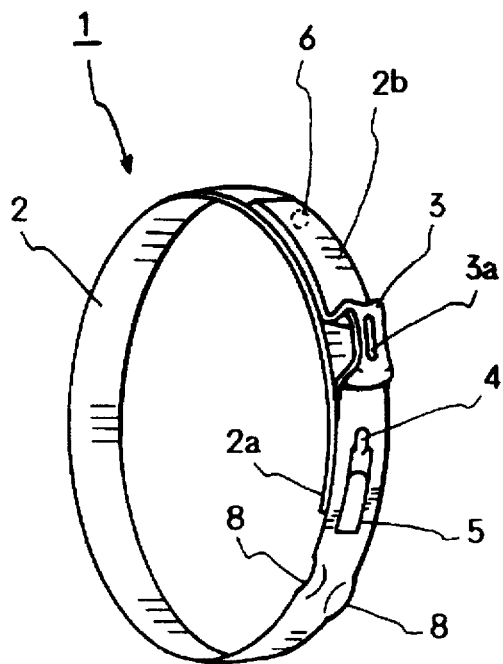
FIG. 1 is a perspective view of a clamping band of a first embodiment of the present invention.
Figure 6:
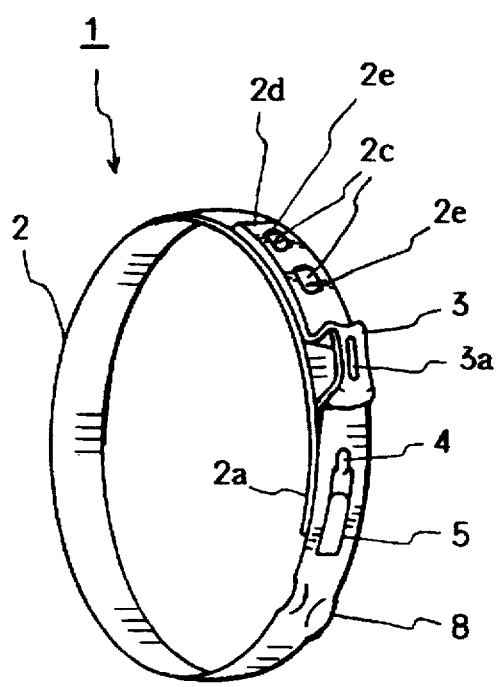
FIG. 6 is a perspective view of the clamping band of another embodiment.
Figure 4:
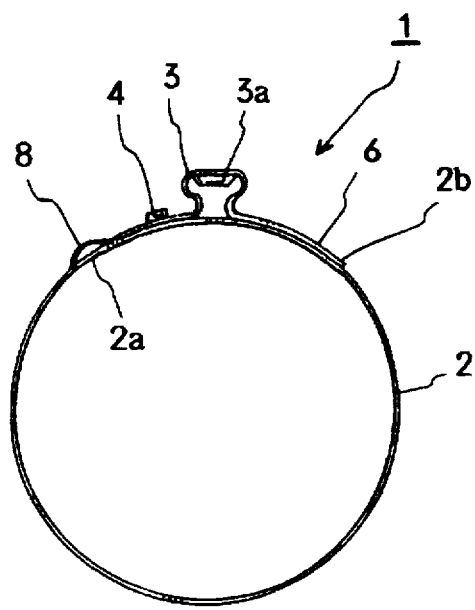
FIG. 4 is a front view of the clamping band whose clamping ear is compressed in the circumferential direction of the band section.

In FIG. 1, a metallic band section 2 of a clamping band 1 has a first end and a second end. The first end section 2a of the band section 1 is formed into a Y-shaped fork having a pair of fork pieces as shown in FIG. 2A. The band section 2 has a pair of concave sections 8, which are formed in each side edge of the band section 2 by bending a part of each side edge outward, and the concave sections 8 are capable of respectively accommodating the fork pieces of the Y-shaped fork 2a. The concave sections 8 are located at positions at which the fork pieces of the Y-shaped fork 2a are respectively accommodated when the clamping band 1 is in a clamped state (see FIG. 4). In the present embodiment, the band section is made of a relatively soft stainless steel, e.g., SUS 430, which has width of 6 mm; thickness of 0.8 mm; and length of 236 mm.

A clamping ear 3 is formed at a position corresponding to a part in which the looped band section is overlapped. The clamping ear 3 is formed into a gate shape by bending the band section outward. The clamping ear 3 is a so-called Oetiker's ear, so it is compressed in the circumferential direction of the looped band section by a tool 7 (see FIG. 5). By compressing the clamping ear 3, the diameter of the looped band section 2 can be reduced to clamp.

In the vicinity of the Y-shaped fork 2a, an engaging piece 4 is projected outward. The engaging piece 4 is capable of engaging with a first engagement hole 5, which is bored at a position corresponding to the Y-shaped fork 2a when the band section 2 is formed into the loop shape (see FIGS. 2E and 2F). The first engagement hole 5 is a long hole bored in the longitudinal direction of the band section 2. With this structure, the band section is formed into a loop shape by engaging the engaging piece 4 with the first engagement hole 5.

The second end section 2b is fixed on an outer face of the band section 2 at a position 6 by resistance welding. By welding the second end section 2b, the band section 2 can be tightly kept in the loop shape. The welding position 6 is optionally correctly defined at a prescribed position by engaging the engaging piece 4 with the first engagement hole 5, so that the welding positions 6 of the clamping band 1 is located at the prescribed position with high positioning accuracy.

Next, manufacturing steps of the clamping band 1 will be explained with reference to FIGS. 2A–2H.

In the band section 2, the engaging piece 4, the concave sections 8, the long first engagement hole 5, the clamping ear 3 and the welding point 6 are arranged from the first end or the Y-shaped fork 2a to the second end 2b.

The Y-shaped fork 2a is formed in the first end section so as to make the narrow fork pieces. By having the narrow fork pieces, the fork piece of the Y-shaped fork 2a are apt to bend radially outward when the clamping ear 3 is compressed to reduce the diameter of the band section 2.

The concave sections 8 are formed by bending the part of each side edge of the band section 2 radially outward with a die-punch machine. As described above, the concave sections 8 are located to accommodate the fork pieces of the Y-shaped fork 2a when the clamping ear 3 is compressed. The depth of the concave sections 8 is designed so that the fork pieces, which have been bent radially outward by compressing the clamping ear 3, of the Y-shaped fork 2a are fitted and accommodated in the concave sections and an inner face of the looped band section 2 is formed flat without a step section (see FIG. 4).

The engaging piece 4 is formed by: cutting the band section 2 to make a tongue piece; and bending the tongue piece outward to form into an L-shape (see FIG. 2B).

The long first engagement hole 5 is bored at a position corresponding to the Y-shaped fork 2a when the band section 2 is formed into the loop shape (see FIG. 2E). Initially, the engaging piece 4 is located at one end of the first engagement hole 5, which is the end on the first end 2a side, by elasticity of the band section 2. In this initial state, the distance between the engaging piece 4 and the second end 2b is always fixed, so the welding position 6 is easily located at the prescribed position with high positioning accuracy (see FIG. 2D).

The clamping ear 3 has a dimple 3a in a top face. The dimple 3a has been formed in the flat band section 2 before forming the clamping ear 3 into the gate shape (see FIG. 2A). When the clamping ear is compressed to reduce the diameter of the looped band section 2, stress in the clamping ear 3 is absorbed by the dimple 3a, so that the top face of the clamping ear 3 is prevented from deforming outward. Further the clamping ear 3 is able to resist springing back and a diameter increase of the band section 2 is securely prevented by forming the dimple 3a.

To effectively execute resistance welding at the welding point 6, there a recess 6a is formed in the vicinity of the second end 2a corresponding to the welding point 6. A bottom face of the recess 6a is capable of contacting an outer face of the band section 2, which is located below the recess 6a (see FIG. 2A). When electric current for the resistance welding is passed between the most inner face at the welding point 6 and the most outer face thereat, the recess 6a is heated and melted, so that the welding point 6 is formed flat.

The band section 2 is formed into the loop shape by the steps of: locating the engaging piece 4 at the initial position in the first engagement hole 5; and resistance-welding the second end section 2a at the welding point 6. In the present embodiment, the clamping band 1 consists of only one part, requiring no complex machining so that manufacturing efficiency is raised, and manufacturing cost is reduced. Further, the clamping band 1 is capable of clamping tightly and securely.

Figure 3A:
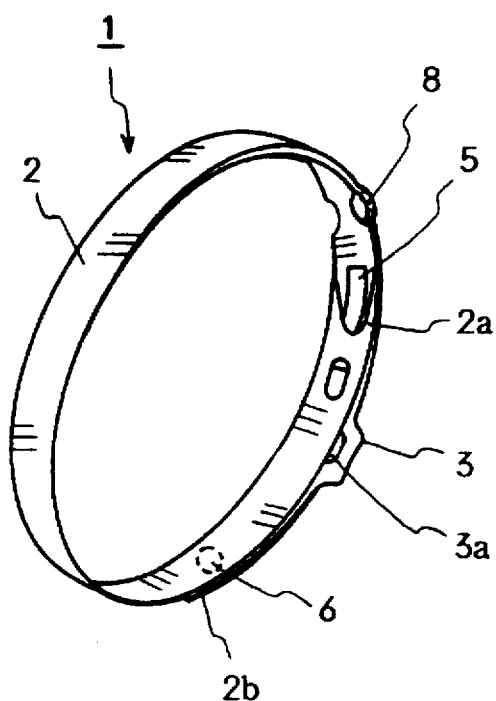
FIG. 3A is a perspective view of the clamping band, which has been formed into a loop shape.
Figure 3B:
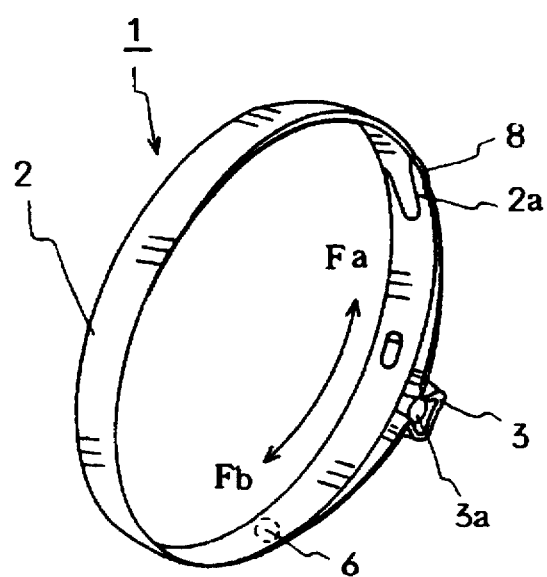
FIG. 3B is a perspective view of the clamping band whose clamping ear is compressed in the circumferential direction of the band section.

To clamp a member to be clamped, firstly the member to be clamped is inserted through the looped clamping band 1, whose clamping ear 3 is not compressed as shown in FIG. 3A, to set the clamping band 1 on a clamping position of the member to be clamped. Then, the clamping ear 3 is compressed in the circumferential direction of the band section 2 by the tool 7 (see FIG. 5) so as to reduce the diameter of the looped band section 2. The diameter reduced state of the clamping band 1 is shown in FIG. 3B.

Figure 5:
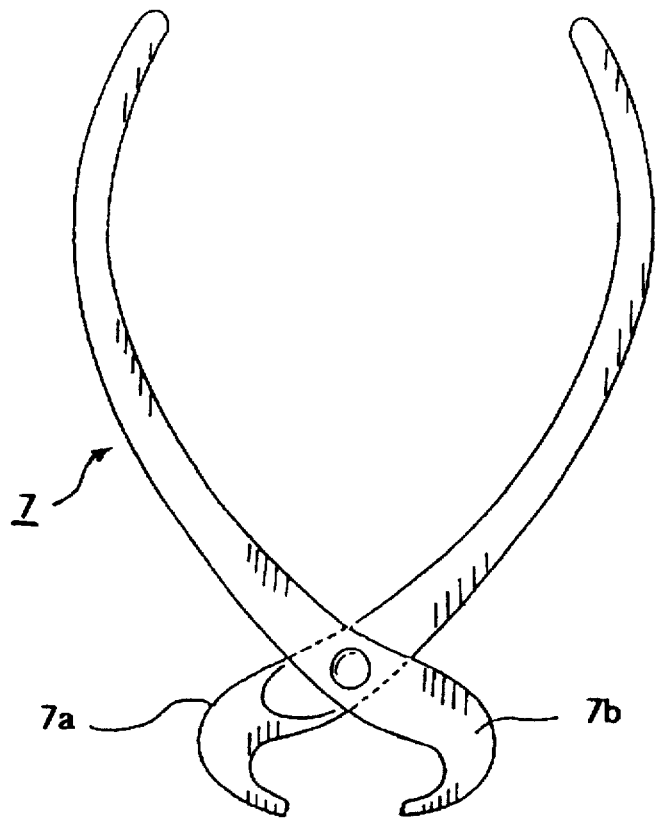
FIG. 5 is a plan view of a tool for compressing the clamping ear.

The tool 7 has a pair of arms 7a and 7b, which are mutually crossed and rotatably connected at the cross point, like a pair of pliers (see FIG. 5).

When the clamping ear 3 is compressed by the tool 7, the Y-shaped fork 2a is moved in the direction of the diameter reduction. The fork pieces of the Y-shaped fork 2a are bent radially outward by force Fa, which works to reduce the diameter of the band section 2, and counter force Fb from the member to be clamped, which works to enlarge the diameter thereof. By the outward bending of the fork pieces, the fork pieces are fitted and accommodated in the concave sections 8, so that the inner face of the looped band section 2 is formed flat without a step section (see FIG. 4), so that the clamping band 1 is capable of uniformly clamping the member to be clamped. With the uniform clamping, the clamping band 1 is capable of tightly and securely clamping the member, so that the safety and the reliability of the clamping band 1 is raised.

After compressing the clamping ear 3, a diameter increase of the band section 2, is caused by the elasticity of the member to be clamped, is limited by the dimple 3a and the welding.

When the clamping ear 3 is compressed by the tool 7, firstly the Y-shaped fork 2a is moved in the direction of the force Fa (see FIG. 3B) to reduce the diameter of the band section 2 and the engaging piece 4 is guided by the long first hole 5 to move in the same direction; then the Y-shaped fork 2a is moved a little in the direction of the force Fb (see FIG. 3B) to enlarge the diameter of the band section 2, so that the engaging piece 4 is engaged with the first hole 5 to completely clamp the member to be clamped. In this case, mutual shift of the parts of the band section 2, which are mutually overlapped, in the transverse direction is prevented because the engaging piece 4 is guided in the circumferential direction of the band section 2 by the long first hole 5.

Successively, a second embodiment of the clamping band of the present invention will be explained with reference to FIG. 6 and FIGS. 7A–7C. Note that, elements shown in the first embodiment are assigned same numeric symbols and explanation will be omitted.

In the first embodiment, the band section 2 of the clamping band 1 is formed into the loop shape by welding at the point 6 before attaching to the member to be clamped. To easily handle the clamping band, the clamping band 1 of the second embodiment is capable of attaching to and detaching from the member to be clamped, which has been already connected to another member, without disconnecting the members. The band section 2 is detachably engaged to form into the loop shape instead of permanent engagement by resistance welding (see FIG. 6).

As clearly shown in FIGS. 7A–7C, there are formed two second engagement holes 2c in the vicinity of the Y-shaped fork 2a. The second engagement holes 2c are formed by the steps of: cutting the band section 2 to make a cutting hole; and embossing an edge of the cutting hole (see FIGS. 7A and 7B). On the other hand, there are formed two engaging sections 2f in the vicinity of the second end 2d. The engaging sections 2f are formed by the steps of: boring holes 2e having tongue pieces 2f; and bending the tongue pieces 2f inward to form into L-shapes (see FIGS. 7A and 7C). The engaging sections 2f are capable of respectively inserting into the second engagement holes 2c to engage when the band section 2 is formed into the loop shape.

The clamping band 1 is formed in the loop shape by the steps of: forming the band section into the loop shape; engaging the engaging piece 4 with the first hole 5; and engaging the engaging sections 2f with the second engagement holes 2c. The band section 2 is engaged on both sides of the clamping ear 3.

With this structure, the clamping band 1 is easily attached to and detached from the member to be clamped after the member is connected to another member.

As described above, since the clamping band consists of only one part, number of parts and number of manufacturing steps can be reduced, so that manufacturing cost is reduced and manufacturing accuracy is raised.

When the clamping ear is compressed, the fork pieces of the Y-shaped fork are fitted and accommodated in the concave sections, so that no step section is formed in the inner face of the looped band section. By forming the flat inner face with no step section, the clamping band is capable of securely and tightly clamping. Thus, the safety and reliability of the clamping band can be raised.

In the case of having the long first engagement hole in which the engaging piece is guided its movement when the clamping ear is compressed, the part of the overlapped section of the band section is prevented from shifting in the transverse direction.

In the case of forming the band section into the loop by engaging the engaging piece with the first engagement hole on the one side of the clamping ear and engaging the engaging section with the second engagement hole on the other side thereof, the clamping band is easily attached to and detached from the members to be clamped.

In the case of having the dimple in the top face of the clamping ear, stress in the clamping ear is absorbed when the clamping ear is compressed, so that the clamping ear is able to resist springing back and the diameter increase of a band section is prevented.

In the case of having the recess for resistance welding in the vicinity of the second end of the band section, the resistance welding to fix the second end is executed effectively.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A clamping band, comprising:
    a metallic band having a first end and a second end, the first end of said band having a form of a Y-shaped fork including a pair of fork pieces;
    said band having a pair of concave sections formed in each side edge margin of said band, said concave sections being capable of respectively accommodating the fork pieces of the Y-shaped fork when said band is formed into a loop with said first end being overlapped by said band and said concave sections facing inwardly; and
    said band including a clamping ear having a gate shape, said clamping ear being disposed at a position on said band overlapping said first end when said band is formed into said loop, said clamping ear being compressible in the circumferential direction of said loop to permit reduction of a diameter of said loop.

2. The clamping band according to claim 1, wherein said concave sections are disposed to accommodate the fork pieces of the Y-shaped fork when said clamping ear is compressed in the circumferential direction of said loop such that an inner face of said loop is stepless.

3. The clamping band according to claim 1, wherein said clamping ear has a top surface with a dimple.

4. The clamping band according to claim 1, wherein a recess for resistance welding is formed in the vicinity of the second end of said band.

5. The clamping band according to claim 1, further comprising:
    an engaging piece disposed proximate the Y-shaped fork of said band; and
    a first engaging hole for engageably accepting said engaging piece, said first engaging hole being disposed proximate the second end of said band whereby said band is formed into the loop when said first engaging hole is engaged with said engaging piece.

6. The clamping band according to claim 5, wherein said first engaging hole is a long hole elongated in the longitudinal direction of said band, and said engaging piece is longitudinally displaceable within said first engaging hole when said clamping ear is compressed in the circumferential direction of said loop.

7. The clamping band according to claim 5, further comprising:
    a second engaging hole disposed proximate the first end of said band; and
    an engaging member disposed proximate the second end of said band section for engaging said second engaging hole permitting said band to be formed into the loop by engaging said engaging piece with said first engaging hole on one side of said clamping ear and engaging said engaging member with said second engaging hole on another side of said clamping ear opposite said one side.

8. The clamping band according to claim 7, wherein
    said second engaging hole is formed by cutting said band to make a cutting hole and embossing an edge of the cutting hole, and
    said engaging member is a tongue piece insertable into said second engaging hole.

9. The clamping band according to claim 7, further comprising a plurality of engaging holes disposed in said band incrementally longitudinally displaced from said second engaging hole.

10. The clamping band according to claim 7, wherein a plurality of engaging members are disposed on said band incrementally longitudinally displaced from said engaging member.

11. The clamping band according to claim 5, wherein said engaging piece is formed by cutting said band to make a tongue piece and bending the tongue piece to form into an L-shape capable of engaging with said first engaging hole.

12. The clamping band according to claim 5, wherein said concave sections are disposed to accommodate the fork pieces of the Y-shaped fork when said clamping ear is compressed in the circumferential direction of said loop such that an inner face of said loop is stepless.

13. The clamping member according to claim 1 further comprising:
    an engaging opening disposed proximate said second end of said band; and
    an engaging member disposed on said band to engage said engaging opening and hold said band in said loop.

14. A clamping band comprising:
    a band having first and second ends, said first end having first and second tabs defining a V-notch in said first end, said V-notch having opposing edges inclined towards one another such that said V-notch becomes progressively narrower and said inclined edges being joined at a bottom of said V-notch;

said band having a length suitable for forming a loop of a desired open diameter wherein an overlap portion of said band is defined by a portion of said band proximate said second end overlapping a portion of said band proximate said first end;

said band having first and second concavities on opposing edges facing inwardly with respect to said loop and having sufficient depth to accept said first and second tabs; and said band having a clamping ear disposed at said overlap portion and proximate said second end, said clamping ear having sufficient dimensions when compressed to close said loop to a desired closed diameter when said second end is fixed at a predetermined position on said band associated with said desired open diameter.

15. The clamping band according to claim 14 further comprising fixing means for fixing said second end at said predetermined position and said means for fixing being disposed on said overlap portion between said clamping ear and said second end.

16. The clamping band according to claim 15 wherein said fixing means includes first and second engaging means for engaging one another, said first engaging means being disposed proximate said second end and said second engaging means being disposed at a position on said band to maintain said loop at said desired open diameter when engaging said first engaging means.

17. The clamping band according to claim 15 wherein said fixing means includes a dimple disposed proximate said second end for facilitating resistance welding of said band at said dimple to a predetermined portion of said band being overlapped by said dimple to secure said loop at said desired open diameter.

18. The clamping band according to claim 17 further comprising alignment means for aligning said dimple with said predetermined portion.

19. The clamping band according to claim 18 wherein said alignment means includes:

said band defining an elongated opening in said overlap portion proximate said clamping ear and on an opposite side of said clamping ear from that of said second end; and said band having an engaging member, disposed proximate said first end, for slidably engaging an end of said elongated opening such that said loop is maintained at said desired open diameter with said second end aligned at said predetermined position for welding and said engaging member is displaceable in said elongated opening to permit closing said loop to said closed diameter.

20. A clamping band comprising:

a band having first and second ends;

said band having a length suitable for forming a loop of a desired open diameter wherein an overlap portion of said band is defined by a portion of said band proximate said second end overlapping a portion of said band proximate said first end;

said band having a clamping ear disposed at said overlap portion and proximate said second end, said clamping ear having sufficient dimensions when compressed to close said loop to a desired closed diameter when said second end is fixed at a predetermined position on said band associated with said desired open diameter;

fixing means for facilitating welding of said second end to said band to fix said second end at said predetermined position; and alignment means for aligning said second end at said predetermined position, said alignment means including:

said band defining an elongated opening in said overlap portion proximate said clamping ear and on an opposite side of said clamping ear from that of said second end; and said band having an engaging member, disposed proximate said first end, for slidably engaging an end of said elongated opening such that said loop is maintained at said desired open diameter with said second end aligned at said predetermined position for welding and said engaging member is displaceable in said elongated opening to permit closing said loop to said closed diameter.

* * * * *